Figure 4:
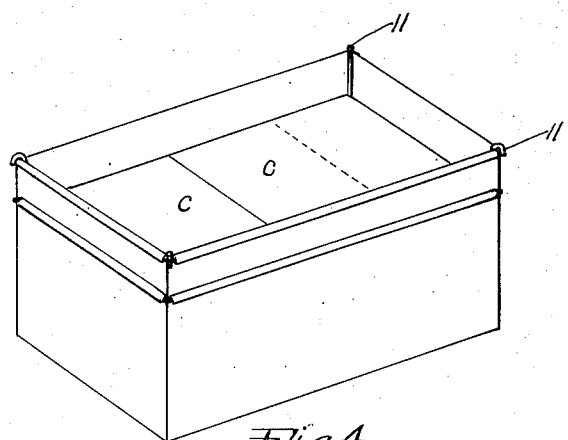

Oct. 31, 1944.  B. F. DAVIS  2,361,749
CHEESE PACKAGING
Filed Oct. 3, 1942  2 Sheets-Sheet 1
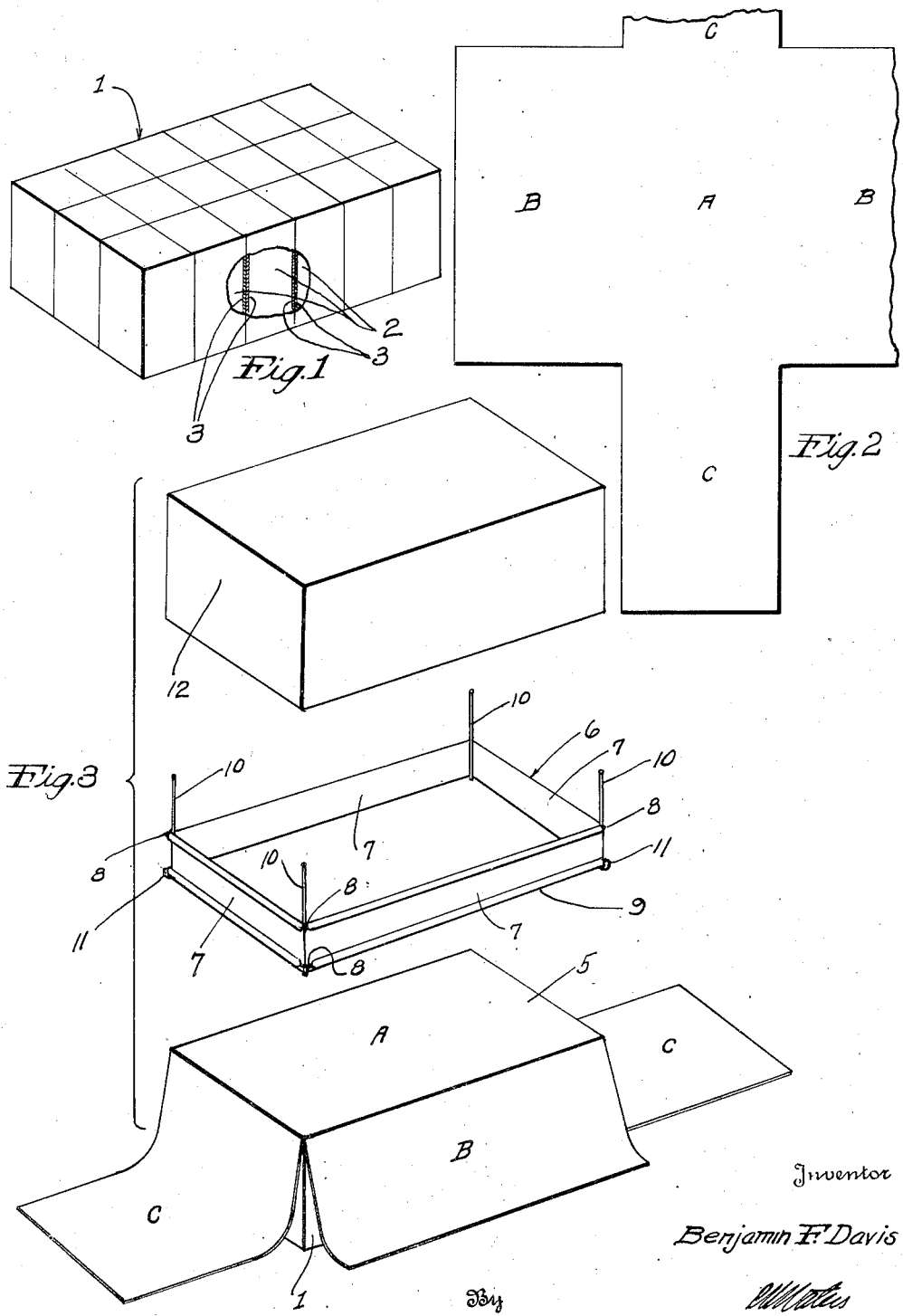

Oct. 31, 1944. B. F. DAVIS 2,361,749
CHEESE PACKAGING
Filed Oct. 3, 1942 2 Sheets-Sheet 2

Inventor
Benjamin F. Davis
By
Attorney

Patented Oct. 31, 1944

2,361,749

UNITED STATES PATENT OFFICE 2,361,749

CHEESE PACKAGING

Benjamin F. Davis, Arena, Wis., assignor to Wingfoot Corporation, Akron, Ohio, a corporation of Delaware Application October 3, 1942, Serial No. 460,633

4 Claims. (Cl. 99—178)

This invention relates to an improved method of packaging cheese.

It has recently been proposed to cure cheese, such as Cheddar cheese and the like while wrapped in an oil-, moisture-, and air-resistant wrapper and while in a frame or box which keeps the cheese under pressure and thus excludes the air. A sheet of rubber hydrochloride film about .0004 inch thick has been satisfactorily used for wrapping this cheese while curing. It has been proposed that this cured cheese be then cut into blocks, wrapped, and then packed in a box or other container under pressure to exclude the air and thus prevent mold from forming on the cured cheese. It has been proposed that the box or other container used for curing the cheese before cutting be again used for packaging the cheese after it has been cured and cut and wrapped. Difficulty has been experienced in returning the wrapped cheese blocks to the same box from which the uncut cheese has been removed. This invention relates to an improved method of returning the wrapped cheese blocks to this box or other container in which the blocks form a snug fit.

According to this invention, the uncut cheese, after curing and after removal of any wrapper used in the curing operation, is cut into blocks the size desired for marketing. These may be ½-pound, 1-pound, 2-pound, or 5-pound blocks. These are then individually wrapped. The wrapper used next to the cheese should be oil-, air-, and moisture-resistant. Rubber hydrochloride film from .0003 up to about .0006 or .0008 inch thick has been found satisfactory for this use although other films may be employed. After wrapping in this inner wrapper, the individual blocks of cheese may be overwrapped with an outer wrapper which forms a more serviceable package. This outer wrap may be applied by the wholesaler at this stage of the process, or it may be applied by the retailer on receipt of the cheese, or each individual block may be wrapped by the retailer as it is sold. The outer wrap is not essential to the invention, but makes a more serviceable package.

A plurality of the cut and wrapped blocks, e. g., ten or twenty, whether covered with a single or double wrap are now returned to the same box or placed in another box and put under pressure and kept thus pressure-packed until they are sold retail, one customer taking one or more of the individual blocks. The pressure-pack keeps the cheese fresh and prevents loss of moisture and the formation of mold.

According to this invention a plurality of these wrapped blocks are forced into a box by means of a sleeve and are placed under pressure in this box. The box in which the cheese is packer is a strong box which will withstand the pressure applied. Ordinarily, a wooden box is used although a strong fiber box may be used. In putting the cheese into the box, the blocks of cheese are arranged so as to cover as nearly as possible the same floor area as the area of the bottom of the box. If the box is a wooden box, the cheese blocks thus arranged are then preferably covered with a fabric, such as paper. Such a paper covering is usually omitted when a fiber box with a smooth interior is used. The paper is preferably die cut so that it comprises an area the same as the area of the bottom of the inside of the box, with flaps extending from this area.

In order to facilitate the introduction of the cheese into the box, a sleeve is first slipped over the cheese blocks after covering with paper or the like if such covering is used. Then the box is put in place, and then, preferably after inverting the box, the sleeve is removed. The box is then put under pressure by inserting an inlay of wood or fiber or the like which is just the area of the inside of the box, and nailing the cover of the box in place. The inlay of wood is usually about ⅛ inch thick or thicker. When it is placed on top of the cheese in the box, it extends above the edges of the box so that when th cover is fastened on to the box, the inlay is pressed down on to the cheese and all of the air is pressed out of the cheese. The cheese is thereafter maintained under pressure. The inlay of wood is just thick enough so that the cover cannot be brought down flush on the top of the box, but is kept a little distance above the top of the box in order to insure that the cheese is kept under pressure.

When the cheese is packed in this way, any gas generated by the cured cheese escapes through whatever openings there are in the wrapper. The cheese fits so snugly in the box that there is no room for the entrance or circulation of air, and thus the cheese is prevented from molding. Furthermore, the lack of circulation of air around each individual block of the cheese tends to prevent dehydration and the formation of rind.

Figure 5:
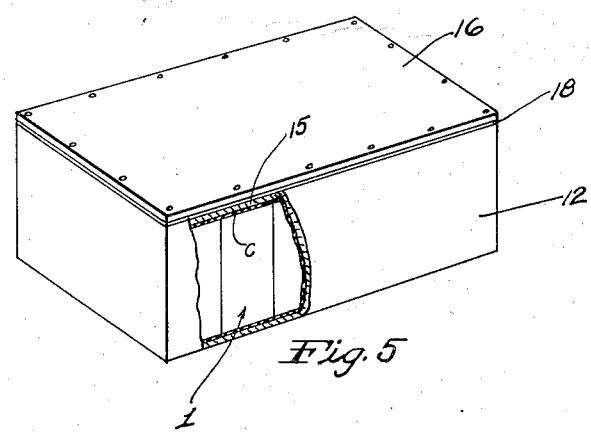

The invention will be further described in connection with the accompanying drawings, in which Fig. 1 illustrates a plurality of wrapped blocks of cured cheese arranged in such a way that they cover an area substantially equal to the area of the bottom of the inside of the box in which they are to be packed. Fig. 2 is a plan view of a liner for the box. Fig. 3 shows the cheese covered by the liner with the sleeve in place and the box inverted above it. Fig. 4 shows the box right side up with the cheese in it and the sleeve in place before its removal. Fig. 5 shows the finished package of cheese maintained under pressure in the box.

Although the cheese may be cut and replaced in the same box in which it has been cured, it is obvious that if the blocks of cheese are all cut to the same size, it is immaterial whether the cheese is returned to the same box or a different box which has been used for curing the cheese or is placed in a new box.

Fig. 1 shows a plurality of blocks of cheese 1, each of which includes the cheese 2 enclosed in the wrapper 3. Fig. 3 shows these blocks of cheese 1 covered by the liner 5 which ordinarily is paper. This liner is die cut as shown in Fig. 2 to comprise a bottom area A, which is equal in size and shape to the bottom of the box, and the flaps B and C, which are folded up around the cheese after it is placed in the box. The liner may be folded, but is preferably placed over the cheese as shown in Fig. 3 without folding.

The sleeve 6 is now placed over the paper and pushed down around the cheese blocks. The four walls 7 of the sleeve are preferably made of stainless steel or tinned iron and are reinforced at the top and bottom by heavy wire 8. The top and bottom of the walls are folded over the wire. By folding the walls as at 9 outward over the wire at the bottom, the bottom edge of the sleeve is flared somewhat, and this makes it easier to place the sleeve over the cheese. The walls of the sleeve need not be perfectly perpendicular, but the area around the bottom may be somewhat larger than the area around the opposite edge of the sleeve; and if the sleeve is made in this way, it may be easier to slip it over the cheese than if the walls are perfectly perpendicular.

The four corner posts 10 may be made of heavy steel wire or they may be rods, and they are preferably welded or soldered into the inside corners of the sleeve. They extend above the upper edge of the sleeve for a couple of inches. If the sleeve is 2 inches wide, these posts may extend 2 inches above the sleeve.

The opposite ends 11 of the four corner posts are turned outward over the wire 8. This facilitates pressing the sleeve down over the cheese. It is necessary to indent the four corner blocks of cheese somewhat in order to make room for these corner posts. By turning the ends of the posts outward, this is more easily done than if the posts are blunt at the bottom end.

The four corner posts preferably rise vertically from the sleeve although they may be inclined somewhat toward the center, as when the four walls of the sleeve are inclined toward the center. These corner posts serve to guide the box 12 so that it sets flush against the upper edge of the sleeve.

In placing the box over the cheese, the liner is first put in place as shown in Fig. 3, and then the sleeve is pushed down over the liner. The sleeve is, of course, open, and the operator can, therefore, guide it over the cheese more readily than he could guide an opaque box. After the sleeve has been pushed part of the way or all of the way down over the cheese, the operator can advantageously pull the paper downward through the sleeve to dress up the package.

After the sleeve has been pushed part or all of the way down over the cheese, the box is put in place over the four corner posts of the sleeve. The box 12 is then pushed down over the cheese until the bottom edge 9 of the sleeve is flush with the support on which the cheese is standing. The box then, of course, sets flush on the top edge of the sleeve.

The whole assembly is then inverted as shown in Fig. 4, and the box is tapped on the support if necessary to cause the cheese to slump down into the bottom of the box. The flaps B and C of the liner are then folded over as indicated in Fig. 4, and the sleeve is removed.

Then to place the cheese under pressure, the wooden inlay 15, which is just the area of the inside of the box, and usually ⅛ inch thick or thicker, is placed in the box over the cheese. The cover 16 is then put in place and is nailed or screwed on. As the cover is drawn toward the box by the nails or screws, the inlay squeezes the cheese so that it fills the box completely. The indentations made by the corner posts 10 in the four corner blocks of the cheese are removed by this pressure, as the cheese fills out the whole box. It will be noted in Fig. 5 that there is a small space 18 between the cover 16 and the body of the box. In fastening the cover in place, the tendency is to reduce this space, but the inlay 15 is so thick that the cover is never drawn flush with the top of the box. As a result, the cheese is kept under pressure while in the box.

The cheese is cured before the blocks are individually wrapped and placed in the box as illustrated in Fig. 5, and is delivered to the retail outlet packaged under pressure as shown and described herein. When the retailer desires to place the cheese on sale, he removes the cover 16 and the inlay 15. The cheese blocks are then nested in the box and may be removed individually as sold. As long as the cheese remains pressure-packed in the box with the cover in place it does not dry out, and the air does not have access to it so it cannot mold.

Although but one form of sleeve is shown in the drawings, it will be appreciated that various types of sleeve may be employed. The invention is not limited to the use of the particular type shown in the drawings.

What I claim is:

1. The method of pressure-packaging cheese which comprises individually wrapping a plurality of blocks of cheese, arranging the wrapped blocks so that they occupy a space substantially equal in size and shape to that of the box into which they are to be packaged, forcing a sleeve over the wrapped blocks, bringing an inverted box down flush with the top edge of the sleeve, then inverting the assembly thus formed and causing the cheese to fill the bottom of the box, then removing the sleeve, inserting into the top of the box on top of the cheese a pressure inlay the size of the inner area of the box and then fastening the cover on the box thereby forcing the inlay into the box and placing the cheese under pressure in an air-free condition therein.

2. The method of pressure-packaging cheese which comprises individually wrapping a plurality of blocks of cheese in a thin, oil-, air-, and moisture-resistant wrapper, arranging the blocks so that they occupy a space substantially equal in size and shape to the interior of the box into which they are to be packaged, placing a liner over the cheese blocks so arranged, forcing a sleeve down over the liner around the wrapped cheese blocks, bringing an inverted box down flush with the top edge of the sleeve, then inverting the assembly thus formed and causing the cheese to fill the bottom of the box, then removing the sleeve, inserting into the top of the box on top of the cheese a pressure inlay the size of the inner area of the box and fastening the cover on to the box thereby forcing the inlay into the box and placing the cheese under pressure in an air-free condition therein.

3. A method of pressure-packaging cheese which comprises individually wrapping hexagonal blocks of cheese in a thin, oil-, air-, and moisture-resistant wrapper, arranging the blocks so that they occupy a space substantially the size and shape of the interior of the box in which they are to be packaged, placing over the blocks so arranged a liner shaped with a central portion which is the area of the bottom of the inside of the box and having four separate flaps appended respectively to the four edges of the said central portion, pushing a sleeve down over the liner-covered cheese, bringing an inverted box flush with the top of the sleeve, inverting the whole assembly, forcing the cheese into the bottom of the box, removing the sleeve, inserting into the top of the box on top of the cheese a pressure inlay the size of the inner area of the box and then forcing the cover on to the box thereby forcing the inlay into the box and exerting pressure on to the cheese to cause it to fill out the entire volume of the box.

4. A method of pressure-packaging cheese which comprises individually wrapping hexagonal blocks of cheese with a thin, oil-, air-, and moisture-resistant wrapper, arranging the blocks so that they occupy a space substantially the size and shape of the interior of the box in which they are to be packaged, placing over the blocks so arranged a liner shaped with a central portion which is the area of the bottom of the inside of the box and having four separate flaps appended respectively to the four sides of the said central portion, placing over the cheese covered with the liner a sleeve rectangular in shape with the bottom edge flaring to assist in pushing the sleeve over the cheese and with four corner posts in the sleeve with their bottom edges rounded outwardly, then placing an inverted box over the corner posts and bringing the box flush with the top edge of the sleeve, inverting the whole assembly, forcing the cheese into the bottom of the box, folding in the flaps of the liner, removing the sleeve, inserting into the top of the box on top of the cheese a pressure inlay the size of the inner area of the box, and then forcing the cover on to the box, thereby forcing the inlay into the box and causing the cheese to fill the contents of the box and remove all air therefrom.

BENJAMIN F. DAVIS.